United States Patent
Ionescu et al.

(10) Patent No.: US 9,940,479 B2
(45) Date of Patent: Apr. 10, 2018

(54) IDENTIFYING AND TRACKING SENSITIVE DATA

(71) Applicant: International Business Machines Corporation, Armonk, NY (US)

(72) Inventors: Paul Ionescu, Kanata (CA); Iosif V. Onut, Ottawa (CA); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 14/887,460

(22) Filed: Oct. 20, 2015

(65) Prior Publication Data

US 2017/0109541 A1   Apr. 20, 2017

(51) Int. Cl.
*G06F 21/62* (2013.01)
*G06F 17/30* (2006.01)
(Continued)

(52) U.S. Cl.
CPC .... *G06F 21/6245* (2013.01); *G06F 17/30327* (2013.01); *G06F 17/30598* (2013.01);
(Continued)

(58) Field of Classification Search
CPC ...... G06F 21/56; G06F 21/57; G06F 21/6245; H04L 63/20; H04L 63/105; H04L 63/0227; H04W 12/02
See application file for complete search history.

(56) References Cited

U.S. PATENT DOCUMENTS 6,445,774 B1 * 9/2002 Kidder ............... H04M 3/10
                                                    379/14.01
7,849,509 B2 * 12/2010 Venkatapathy ....... G06F 21/577
                                                    717/126
(Continued)

FOREIGN PATENT DOCUMENTS

WO       2014026607 A1    2/2014

OTHER PUBLICATIONS

Li et al. U.S. Appl. No. 62/078,552: "ULeak: Detect Sensitive User Input Leakage from Massive Android Apps: Appendix to the Specification." pp. 5-17. filed Nov. 12, 2014.*

(Continued)

*Primary Examiner* — Kari Schmidt
(74) *Attorney, Agent, or Firm* — Jared C. Chaney (57) ABSTRACT

A method of classifying privacy relevance of an application programming interface (API) comprises analyzing a set of input applications to identify a plurality of custom APIs and generating a respective taint specification for each identified custom API. The method further comprises generating taint flows based on each taint specification and matching features and associated feature values from the taint flows to a set of feature templates. The method also comprises correlating the matched features and associated feature values with respective privacy relevance of the plurality of custom APIs to identify a set of privacy relevant features. The method further comprises detecting a candidate API, extracting features from the candidate API and comparing the extracted features to the set of privacy relevant features. Based on the comparison, a label is assigned to the candidate API indicating privacy relevance of the candidate API.

19 Claims, 4 Drawing Sheets

(51) Int. Cl.
H04L 29/06 (2006.01)
G06F 21/56 (2013.01)
G06F 21/57 (2013.01)
H04W 12/02 (2009.01)

(52) U.S. Cl.
CPC ........ *G06F 17/30867* (2013.01); *G06F 21/56* (2013.01); *G06F 21/57* (2013.01); *H04L 63/0227* (2013.01); *H04L 63/105* (2013.01); *H04L 63/20* (2013.01); *H04W 12/02* (2013.01)

(56) References Cited

U.S. PATENT DOCUMENTS

| | | | | |
|---|---|---|---|---|
| 8,127,360 | B1* | 2/2012 | Wilhelm | G06F 21/552 726/25 |
| 8,671,455 | B1 | 3/2014 | Zhu et al. | |
| 8,875,298 | B2* | 10/2014 | Li | G06F 21/577 726/25 |
| 8,955,139 | B2 | 2/2015 | Dolby et al. | |
| 9,171,028 | B1* | 10/2015 | Collingbourne | G06F 11/3636 |
| 9,177,137 | B2 | 11/2015 | Gluck et al. | |
| 2005/0256866 | A1* | 11/2005 | Lu | G06F 17/30867 |
| 2011/0087892 | A1* | 4/2011 | Haviv | G06F 11/3692 713/187 |
| 2011/0145918 | A1 | 6/2011 | Jung et al. | |
| 2012/0110174 | A1 | 5/2012 | Wootton et al. | |
| 2012/0137375 | A1* | 5/2012 | Ramachandran | H04L 63/105 726/28 |
| 2013/0097652 | A1* | 4/2013 | Bhattacharjee | G06F 21/566 726/1 |
| 2013/0152154 | A1 | 6/2013 | Xiao et al. | |
| 2014/0020094 | A1* | 1/2014 | Wang | G06F 21/57 726/22 |
| 2014/0047538 | A1* | 2/2014 | Scott | G06F 11/3604 726/22 |
| 2014/0059690 | A1* | 2/2014 | Li | G06F 21/577 726/25 |
| 2014/0259190 | A1* | 9/2014 | Kiang | G06F 21/6218 726/30 |
| 2015/0237011 | A1* | 8/2015 | Bhattacharjee | H04L 63/0227 726/1 |
| 2015/0248559 | A1* | 9/2015 | Madou | H04L 63/1433 726/25 |
| 2015/0264065 | A1* | 9/2015 | Jung | G06F 21/52 726/22 |
| 2015/0356282 | A1* | 12/2015 | Heen | G06F 21/552 726/22 |
| 2016/0012050 | A1* | 1/2016 | Bursey | H04L 67/306 707/732 |
| 2016/0132679 | A1* | 5/2016 | Li | G06F 21/6245 726/23 |
| 2016/0171225 | A1 | 6/2016 | Hay et al. | |
| 2016/0378987 | A1* | 12/2016 | Ferrara | H04L 63/20 726/1 |

OTHER PUBLICATIONS

Enck, William, et al. "TaintDroid: An information-flow tracking system for realtime privacy monitoring on smartphones." ACM Transactions on Computer Systems (TOCS) 32.2 (2014): 5.*

Y. Fratantonio, A. Bianchi, W. Robertson, E. Kirda, C. Kruegel and G. Vigna, "TriggerScope: Towards Detecting Logic Bombs in Android Applications," 2016 IEEE Symposium on Security and Privacy (SP), San Jose, CA, 2016, pp. 377-396.*

Anonymous, "System, Method and Apparatus for Detecting Leakage of Custom Secret Data via Correlation Analysis", IP.com Prior Art Database Technical Disclosure. IP.com No. 000238838. IP.com Electronic Publication: Sep. 22, 2014. 3 pages.

Enck, W., et al., "TaintDroid: An Information-Flow Tracking System for Realtime Privacy Monitoring on Smartphones", Proceedings of the 9th USENIX Conference on Operating Systems Design and Implementation, OASDI '10. Article No. 1-6. USENIX Association, Berkeley, CA 2010. 15 pages.

Enck, W., et al. A Study of Android Application Security, Proceedings of the 20th USENIX Conference on Security, SEC'11. USENIX Association, Berkeley, CA 2011. 16 pages.

Lokhande, B., et al., "Overview of Information Flow Tracking Techniques Based on Taint Analysis for Android", 2014 International Conference on Computing for Sustainable Global Development (INDIACom). pp. 749-753.

Mell, P., et al., "The NIST Definition of Cloud Computing", Recommendations of the National Institute of Standards and Technology. NIST Special Publication 800-145. Sep. 2011. 7 pages.

Tripp, O., et al., "A Bayesian Approach to Privacy Enforcement in Smartphones". pp. 1-17. http://researcher.ibm.com/researcher/files/us-otripp/usenix14.pdf.

Tripp, O., et al, "TAJ: Effective Taint Analysis of Web Applications", PLDI'09, Jun. 15-20, 2009. Dublin, Ireland. Copyright 2009 ACM. pp. 87-97.

* cited by examiner

IDENTIFYING AND TRACKING SENSITIVE DATA

BACKGROUND

With the emergence of mobile and smartphone technologies, concern over data privacy has grown. In particular, mobile applications often access, use, and/or communicate private or sensitive information such as the user's location, device identifiers, social connections, user preferences, etc.

SUMMARY

Aspects of the disclosure provide a method, system, and computer program product for classifying privacy relevance of an application programming interface (API). In one embodiment, the method comprises analyzing a set of input applications to identify a plurality of custom APIs and generating a respective taint specification for each identified custom API. The method further comprises generating taint flows based on each taint specification and matching features and associated feature values from the taint flows to a set of feature templates. The method also comprises correlating the matched features and associated feature values with respective privacy relevance of the plurality of custom APIs to identify a set of privacy relevant features. The method further comprises detecting a candidate API, extracting features from the candidate API and comparing the extracted features to the set of privacy relevant features. Based on the comparison, a label is assigned to the candidate API indicating privacy relevance of the candidate API.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Figure 1:
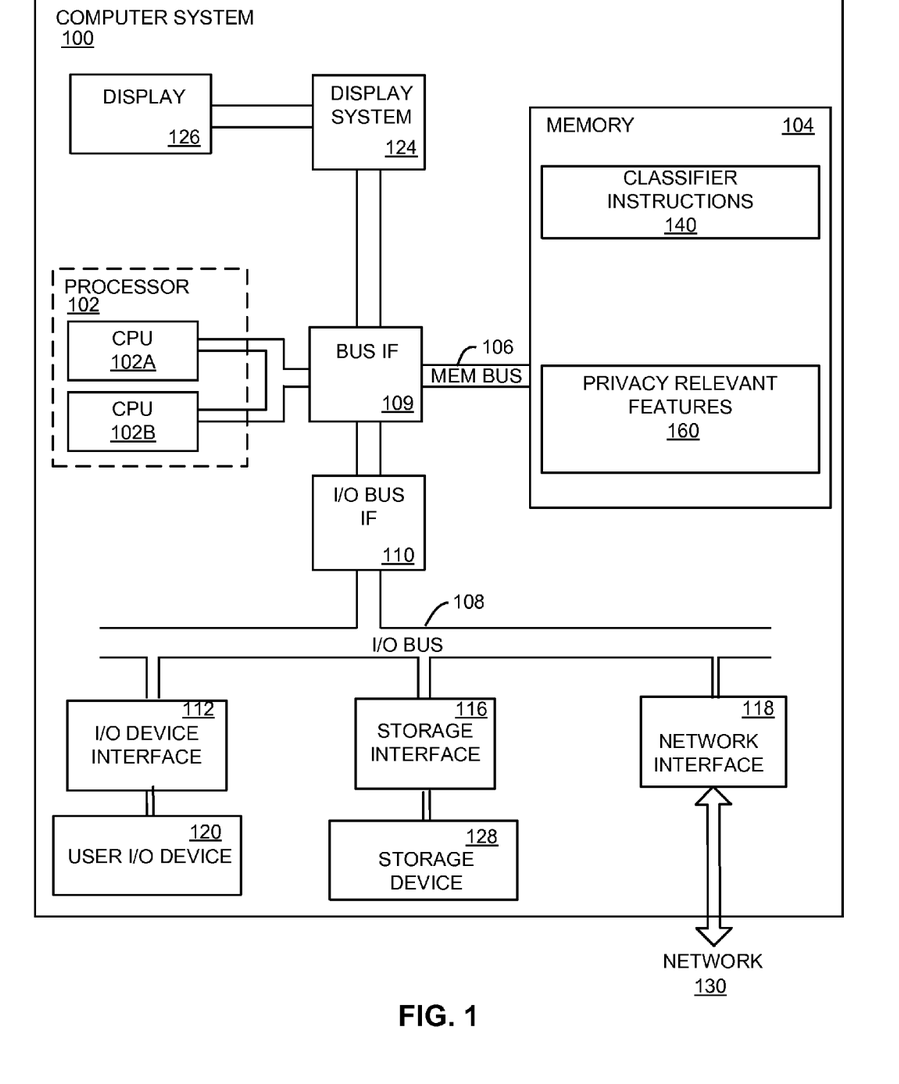
FIG. 1 is a block diagram of one embodiment of an example computer system for classifying the privacy relevance of a candidate API.

FIG. 1 is a high-level block diagram of one embodiment of an example computer system 100. The components of the computer system 100 shown in FIG. 1 include one or more processors 102, a memory 104, a storage interface 116, an Input/Output ("I/O") device interface 112, and a network interface 118, all of which are communicatively coupled, directly or indirectly, for inter-component communication via a memory bus 106, an I/O bus 108, bus interface unit ("IF") 109, and an I/O bus interface unit 110.

In the embodiment shown in FIG. 1, the computer system 100 also includes one or more general-purpose programmable central processing units (CPUs) 102A and 102B, herein generically referred to as the processor 102. In some embodiments, the computer system 100 contains multiple processors. However, in other embodiments, the computer system 100 is a single CPU system. Each processor 102 executes instructions stored in the memory 104.

In some embodiments, the memory 104 includes a random-access semiconductor memory, storage device, or storage medium (either volatile or non-volatile) for storing or encoding data and programs. For example, the memory 104 may store classifier instructions 140 and/or privacy relevant features 160, each of which is described in more detail below. In some embodiments, the memory 104 represents the entire virtual memory of the computer system 100, and may also include the virtual memory of other computer systems coupled directly to the computer system 100 or connected via a network 130. In some embodiments, the memory 104 is a single monolithic entity, but in other embodiments, the memory 104 includes a hierarchy of caches and other memory devices. For example, the memory 104 can exist in multiple levels of caches, and these caches may be further divided by function, so that one cache holds instructions while another holds non-instruction data, which is used by the processor. The memory 104 may be further distributed and associated with different CPUs or sets of CPUs, as is known in any various so-called non-uniform memory access (NUMA) computer architectures, for example.

Hence, although the classifier instructions 140 and privacy relevant features are stored on the same memory 104 in the example shown in FIG. 1 for purposes of explanation, it is to be understood that other embodiments can be implemented differently. For example, each of the classifier instructions 140 and privacy relevant features 160 can be stored on separate media in other embodiments. In addition, in some embodiments, the classifier instructions 140 and/or the privacy relevant features 160 can be distributed across multiple physical media.

Furthermore, in some embodiments, the classifier instructions 140 are executed by the same processor 102. However, in other embodiments, execution of the classifier instructions 140 is distributed across multiple processors located in the same or different computer systems. For example, in some such embodiments, at least a portion of the instructions and data structures associated with the classifier instructions 140 can be on different computer systems and accessed remotely, e.g., via a network 130. The computer system 100 can use virtual addressing mechanisms that allow the programs of the computer system 100 to behave as if they only have access to a large, single storage entity instead of access to multiple, smaller storage entities. Thus, the memory 104 can store all or a portion of the various programs, modules, and data structures for identifying and tracking sensitive data as discussed herein The computer system 100 in the embodiment shown in FIG. 1 also includes a bus interface unit 109 to handle communications among the processor 102, the memory 104, the display system 124, and the I/O bus interface unit 110. The I/O bus interface unit 110 is coupled with the I/O bus 108 for transferring data to and from the various I/O units. In particular, the I/O bus interface unit 110 can communicate with multiple I/O interface units 112, 116, and 118, which are also known as I/O processors (IOPs) or I/O adapters (IOAs), through the I/O bus 108. The display system 124 includes a display controller, a display memory, or both. The display controller can provide video, audio, or both types of data to a display device 126. The display memory may be a dedicated memory for buffering video data. The display system 124 is coupled with the display device 126, such as a standalone display screen, computer monitor, television, a tablet or handheld device display, or another other displayable device. In some embodiments, the display device 126 also includes one or more speakers for rendering audio. Alternatively, one or more speakers for rendering audio may be coupled with an I/O interface unit. In alternate embodiments, one or more functions provided by the display system 124 are on board an integrated circuit that also includes the processor 102. In addition, in some embodiments, one or more of the functions provided by the bus interface unit 109 is on board an integrated circuit that also includes the processor 102.

The I/O interface units support communication with a variety of storage and I/O devices. For example, the I/O device interface unit 112 supports the attachment of one or more user I/O devices 120, which may include user output devices (such as a video display devices, speaker, fax machine, printer, and/or television set) and user input devices (such as a keyboard, mouse, keypad, touchpad, trackball, buttons, light pen, or other pointing devices). A user can manipulate the user input devices 120 using a user interface, in order to provide input data and commands to the user I/O device 120 and the computer system 100. Additionally, a user can receive output data via the user output devices. For example, a user interface may be presented via the user I/O device 120, such as displayed on a display device, played via a speaker, or printed via a printer.

The storage interface 116 supports the attachment of one or more disk drives or direct access storage devices 128 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 128 is implemented via any type of secondary storage device. The contents of the memory 104, or any portion thereof, may be stored to and retrieved from the storage device 128 as needed. The network interface 218 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100, can include multiple I/O bus interface units 110 and/or multiple I/O buses 108 in other embodiments. While multiple I/O interface units are shown, which separate the I/O bus 108 from various communication paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, or any other suitable type of electronic device. In addition, in some embodiments, the computer system 100 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Some example cloud computing embodiments are discussed in more detail below.

As discussed above, in some embodiments, one or more of the components and data shown in FIG. 1 include instructions or statements that execute on the processor 102 or instructions or statements that are interpreted by instructions or statements that execute the processor 102 to carry out the functions as described herein. In other embodiments, one or more of the components shown in FIG. 1 are implemented in hardware via semiconductor devices, chips, logical gates, circuits, circuit cards, and/or other physical hardware devices in lieu of, or in addition to, a processor-based system.

In operation, the computer system 100 is configured to automatically detect and characterize privacy-relevant uses of custom privacy application programming interfaces (APIs). As used herein, the terms "custom privacy API" and "custom API" are used interchangeably and refer to an API which may or may not convey sensitive or private information depending on the implementation of the API. In other words, a custom API has the potential to convey sensitive or private information, but, depending on the implementation, may not be a source or a sink of sensitive information. One such type of a custom API is an editable text box. Data input into the text field can be non-sensitive data or sensitive data depending on the custom use of the API. For example, the text box could be used to collect sensitive data such as social security numbers or credit card numbers. However, it is to be understood that custom APIs are not limited to text boxes. Additionally, as used herein, the terms "privacy", "sensitive", and "security" can be used interchangeably in reference to data which is not to be shared publicly or exposed to public discovery, such as via custom APIs.

As stated above, the computer system 100 is configured to automatically determine whether a custom API conveys sensitive data. In particular, the classifier instructions 140, when executed by the processor 102, cause the processor 102 to determine the set of privacy relevant features 160 based on analysis of a group of applications and feature templates, as described in more detail below with respect to FIG. 2. The set of privacy relevant features 160 are used to distinguish between privacy-relevant and privacy-irrelevant uses of custom APIs. After identifying the set of privacy relevant features 160, when a candidate API is loaded for execution, the classifier instructions 140 cause the processor 102 to classify a candidate API based on a comparison of features of the candidate API with the set of privacy relevant features 160, as discussed in more detail with respect to FIG. 2.

Figure 2:
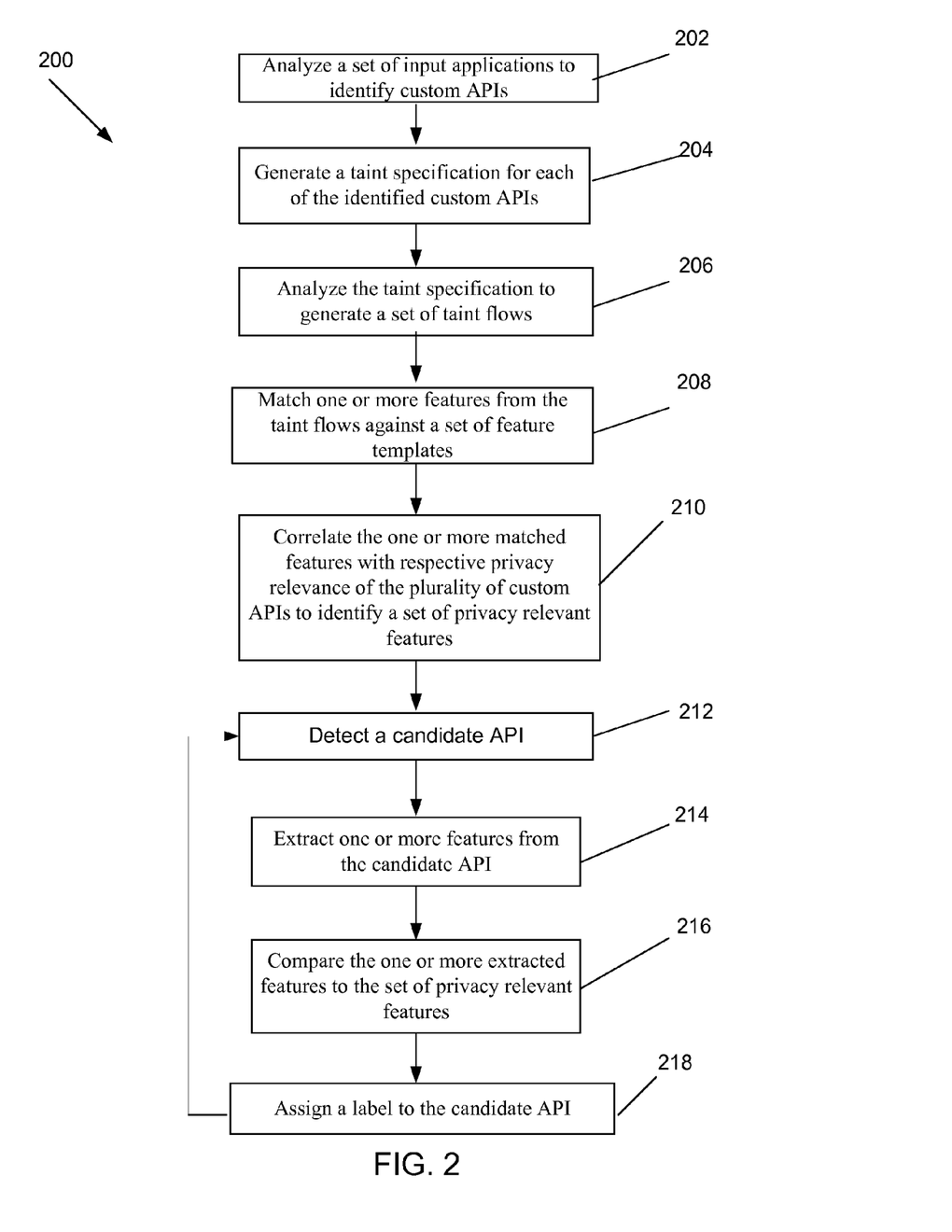
FIG. 2 is a flow chart depicting one embodiment of an example method of classifying the privacy relevance of a candidate API.

FIG. 2 is a flow chart of one embodiment of a method 200 of classifying the privacy relevance of a candidate API. The method 200 can be implemented by a processor executing instructions, such as processor 102 executing the classifier instructions 140 discussed above. At block 202, a set of input applications are analyzed to identify custom APIs. For example, a set of input applications for mobile devices can be obtained from online sources such as, but not limited to, Google Play™ and Apple's App Store℠. Each of the input applications is analyzed to identify custom APIs in the respective input application. For example, in some embodiments, an abstract syntax tree (AST) representative of the code of the application is searched to find occurrences of custom APIs which may be a source or sink of sensitive or private data. A source is an API which obtains data and a sink is an API which communicates data. Hence, as used herein, a custom source is an API which potentially obtains private data. For example, an API which potentially obtains data from a user or data regarding a user device (e.g. device ID, phone number, etc.) is a custom source. A custom sink, as used herein, is an API which potentially communicates private data from the user device. An AST can be used to find occurrences of custom APIs (source and/or sink), for example, by identifying behavior indicative of an API inputting or outputting data from a user. Abstract syntax trees are known to one of skill in the art and not discussed in more detail herein.

At block 204, a taint specification is generated for each of the identified custom APIs. A taint specification relates sources and sinks. For example, in some embodiments, a taint specification is generated for each custom source relating that custom source to each identified custom sink. Similarly, in some embodiments, a taint specification is generated for each custom sink relating that custom sink to each identified custom source.

At block 206, the taint specifications are applied to the input applications to record data values arising at the custom sources and custom sinks. For example, the input applications can be instrumented based on the taint specifications to record the data values. Based on the data recorded from the instrumentation, a set of taint flows are generated, each having a custom source, a custom sink, or both. A taint flow is the path the data travels from the source to the sink along with changes or transformation to the data along the path. At block 208, each of the taint flows are compared to or matched against a set of feature templates to identify features in the respective taint flow which are indicative of the security relevance of the custom API. The feature templates can be stored on the memory 104, in some embodiments.

The feature templates are characteristics which can be indicative of privacy relevance. For example, the set of feature templates can include keywords and associations. Some illustrative keywords include 'credit card', 'number', 'contacts', 'password', 'tel:', etc. The presence of these keywords in the API may indicate that the API is relevant to sensitive data. Similarly, associations between different terms for privacy relevant data can be included in the feature templates. For example, common parameter names associated with the International Mobile station Equipment Identity (IMEI) number include 'uid', 'user-id', 'imei', 'deviceId', 'deviceSerialNumber', 'devicePrint', and 'X-DSN'. In another example, common parameter names associated with phone number include 'phone' and 'mdn' while common parameter names for International Mobile Subscriber Identity (IMSI) include 'did' and 'imsi'.

In addition to, or in lieu of, keywords and associations, other features can be used in the set of feature templates, such as, but not limited to, channel properties and proximate transformations. For example, channel properties or configurations of a custom API, such as, but not limited to, masking characters of a text box or using a file sink whose name and/or path are typically reserved for private data, can be indicative of security relevance. The proximate transformations refer to transformations to the data along the taint flow. In particular, transformations via certain well-known APIs may indicate the security relevance of the custom API. For example, some such well-known APIs in the Android operating system include, but are not limited to, Base64.encode( . . . ), Integer.parseInt( . . . ), and String.format( . . . ). Such well known APIs can be used to infer security relevance because sensitive data is expected to be processed in certain standard ways. For example, it is expected that a credit card number consisting of 16 digits has a fixed format and structure regardless of how it was read into the code. Thus, the manner in which transformations of well-known APIs are applied to data read from a custom API can indicate the security/privacy relevance of the custom API.

At block 210, a correlation between the security relevance of custom APIs to features identified based on the comparison at block 208 and the respective feature values is determined. For example, one such identified feature can be a text box with a name value of 'password'. To perform the correlation, a statistical regression analysis can be applied, for example. In some embodiments, the correlation includes unsupervised clustering. In unsupervised clustering the custom APIs from the set of input applications are separated into groups based on proximity or similarity between the respective identified features and feature values of each custom API. For example, various well-known techniques can be used to group the custom APIs, such as, but not limited to, self-organizing maps, Hidden Markov Model (HMM), Bayes formula, and K-means clustering (with k=2 for example). After separating the custom APIs into groups, each group is annotated as either privacy relevant or privacy irrelevant. The annotation can be determined by a processor based on user input, such as input regarding the set of input applications. Alternatively, the user input can be a direct indication of whether a group is privacy relevant or privacy irrelevant.

In other embodiments, the correlation includes supervised clustering. In supervised clustering, each instance of a custom API is annotated as either privacy relevant or privacy irrelevant based on user input. After each instance of a custom API is annotated, a correlation between privacy relevance and different features with the respective feature values is determined for the respective custom API. In both supervised and unsupervised clustering, the correlation identifies a set of privacy relevant features (e.g. privacy relevant features 160) which can be stored for later use in classifying a candidate API.

At block 212, a computer system, such as computer system 100, monitors for execution of a candidate API. A candidate API is a custom API for which the privacy relevance is unknown. For example, in some embodiments involving a cloud based service, the computer system can monitor for candidate APIs in new applications uploaded to the cloud based service via a network interface such as network interface 118. In some embodiments implemented at the platform level, such as a component of a mobile operating system, the computer system monitors for installation or execution of applications with candidate APIs.

At block 214, in response to detecting a candidate API, the computer system extracts features of the candidate API, such as the features discussed above. At block 216, the extracted features of the candidate API are compared to the set of privacy relevant features identified at block 210. Based on the comparison of the extracted features to the set of privacy relevant features, the candidate API is assigned a label indicating the privacy relevance of the candidate API at block 218. For example, the label can indicate that the candidate API is privacy relevant or privacy irrelevant based on the how much the extracted features match the set of privacy relevant features. Furthermore, assigning the label can include, in some embodiments, providing an output to a user indicating the privacy relevance, such as via a printer, display, or audio device. The method 200 then returns to block 212 where the computer system continues to monitor for additional candidate APIs. Thus, in some embodiments, blocks 202-210 are performed once while blocks 212-218 are repeated as new candidate APIs are detected. In other embodiment, blocks 202-210 can also be performed periodically to update the set of privacy relevant features.

The acts at block 202-210 are also referred to herein as a training or offline phase and the acts at block 212-218 are referred to herein as an online or operation phase. Due to the identification of privacy relevant features during the offline phase, the online phase can be executed in approximate real time. This is due to relatively low computation complexity of extracting features from the candidate API, such as those discussed above, and comparing the extracted features to the set of privacy relevant features. The computation complexity is relatively low compared to the complexity of developing the taint flows and deriving the correlation between the features/feature values to the privacy relevance of the associated custom APIs performed in the offline phase.

As discussed above, it is to be understood that execution of the method 200 can be performed by a single processor in a single device or distributed among different computer systems. For example, in some embodiments, the acts at blocks 202-210 and 216 can be performed on one computer system while blocks 212-214 and 218 can be performed by another computer system. Other distributions of executing the blocks in method 200 are also possible.

It is to be understood that the order in which the blocks described above are discussed is not to be construed as limiting the order in which the individual acts can be performed. In particular, the acts performed can be performed simultaneously or in a different order than that discussed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
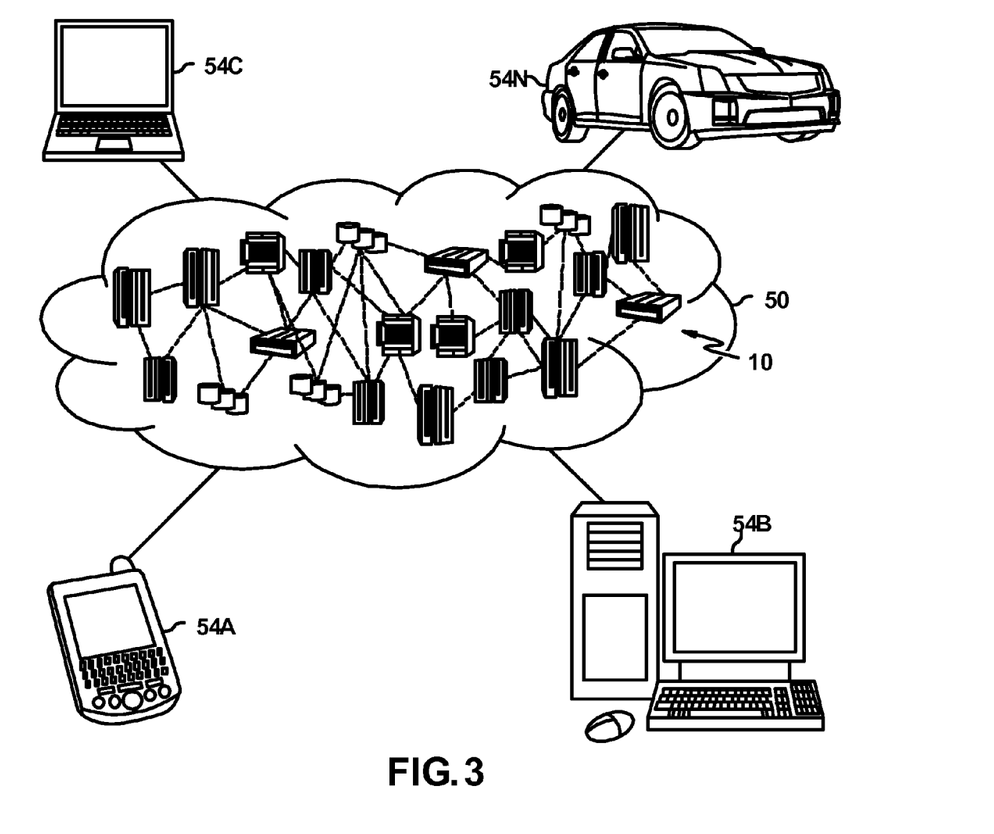
FIG. 3 depicts one embodiment of a cloud computing environment.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
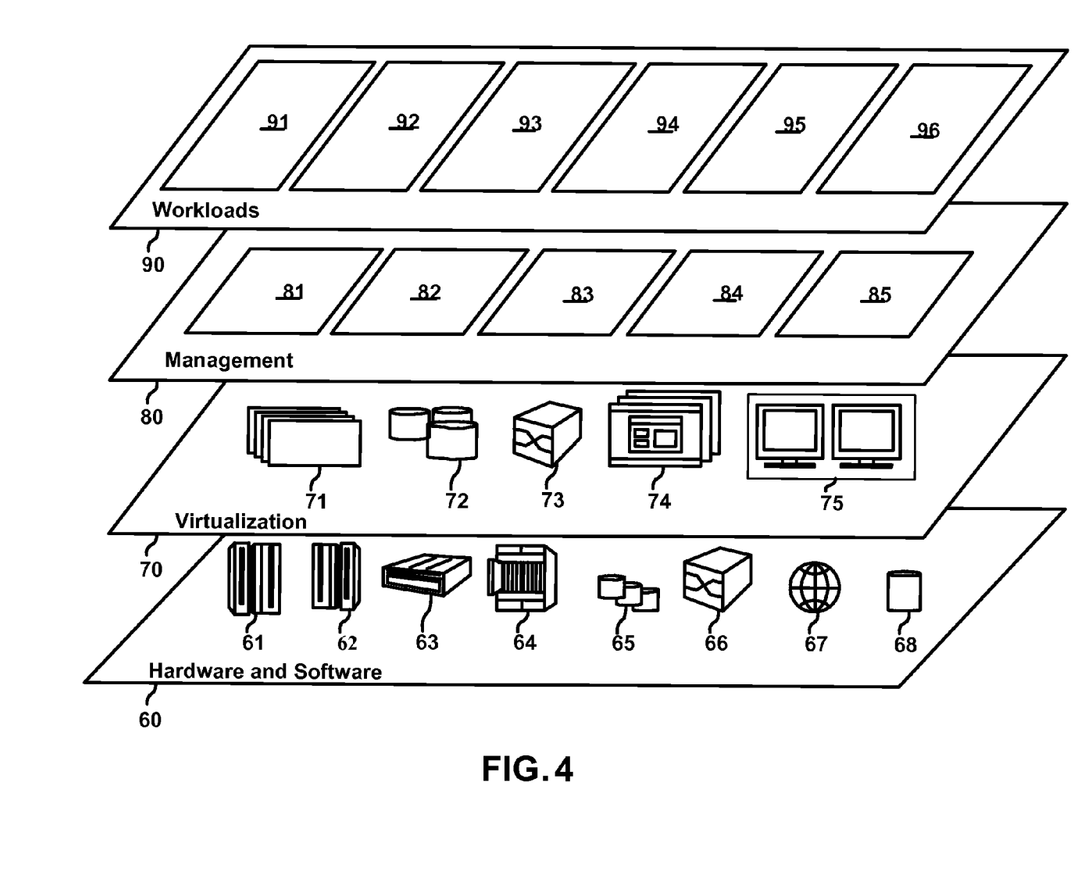
FIG. 4 depicts one embodiment of abstraction model layers.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and classifier processing 96. The classifier processing 96 can perform the offline and/or the online phases discussed above with respect to FIG. 2 to determine the privacy relevance of a candidate API.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a computer-implemented method of classifying privacy relevance of an application programming interface (API). The method comprises analyzing a set of input applications to identify a plurality of custom APIs; generating a respective taint specification for each identified custom API, each taint specification relating one or more sources of data to one or more data sinks; generating one or more taint flows based on each taint specification, the one or more taint flows being a data path and associated data values between a source of data and a data sink; matching one or more features and associated feature values from the one or more taint flows to a set of feature templates; correlating the one or more matched features and associated feature values with respective privacy relevance of the plurality of custom APIs to identify a set of privacy relevant features; detecting a candidate API; extracting one or more features from the candidate API; comparing the one or more features from the candidate API to the set of privacy relevant features; and assigning a label to the candidate API indicating privacy relevance of the candidate API.

Example 2 includes the method of Example 1, wherein analyzing a set of input applications to identify a plurality of custom APIs comprises searching respective abstract syntax trees, each representative of one of the set of input applications, to identify the plurality of custom APIs.

Example 3 includes the method of any of Examples 1-2, wherein the set of feature templates includes a plurality of keywords.

Example 4 includes the method of any of Examples 1-3, wherein the set of feature templates includes a plurality of channel properties.

Example 5 includes the method of any of Examples 1-4, wherein the set of feature templates includes a plurality of proximate transformations.

Example 6 includes the method of any of Examples 1-5, wherein correlating the one or more matched features and associated feature values with respective privacy relevance of the plurality of custom APIs comprises: grouping the matched features based on similarity of features and associated feature values; and annotating each group as privacy relevant or privacy irrelevant.

Example 7 includes the method of any of Examples 1-5, wherein correlating the one or more matched features and associated feature values with respective privacy relevance of the plurality of custom APIs comprises: annotating each instance of each custom API as privacy relevant or privacy irrelevant; and identifying features and associated feature values of privacy relevant instances of the plurality of custom APIs as the set of privacy relevant features.

Example 8 includes a program product comprising a processor-readable storage medium having program instructions embodied thereon, wherein the program instructions are configured, when executed by at least one programmable processor, to cause the at least one programmable processor to analyze a set of input applications to identify a plurality of custom APIs; generate a respective taint specification for each identified custom API, each taint specification relating one or more sources of data to one or more data sinks; generate one or more taint flows based on each taint specification, the one or more taint flows being a data path and associated data values between a source of data and a data sink; match one or more features and associated feature values from the one or more taint flows to a set of feature templates; correlate the one or more matched features and associated feature values with respective privacy relevance of the plurality of custom APIs to identify a set of privacy relevant features; detect a candidate API; extract one or more features from the candidate API; compare the one or more features from the candidate API to the set of privacy relevant features; and assign a label to the candidate API indicating privacy relevance of the candidate API.

Example 9 includes the program product of Example 8, wherein the program instructions are further configured to cause the at least one programmable processor to analyze a set of input applications by searching respective abstract syntax trees, each representative of one of the set of input applications, to identify the plurality of custom APIs.

Example 10 includes the program product of any of Examples 8-9, wherein the set of feature templates includes a plurality of keywords.

Example 11 includes the program product of any of Examples 8-10, wherein the set of feature templates includes at least one of a plurality of channel properties and a plurality of data transformations.

Example 12 includes the program product of any of Examples 8-11, wherein the program instructions are further configured to cause the at least one programmable processor to correlate the one or more matched features and associated feature values with respective privacy relevance of the plurality of custom APIs by grouping the matched features based on similarity of features and associated feature values; and annotating each group as privacy relevant or privacy irrelevant.

Example 13 includes the program product of any of Examples 8-11, wherein the program instructions are further configured to cause the at least one programmable processor to correlate the one or more matched features and associated feature values with respective privacy relevance of the plurality of custom APIs by annotating each instance of each custom API as privacy relevant or privacy irrelevant; and identifying features and associated feature values of privacy relevant instances of the plurality of custom APIs as the set of privacy relevant features.

Example 14 includes a computer system. The computer system comprises a memory; a network interface; and a processor communicatively coupled to the memory and the network interface. The processor is configured to obtain a set of input applications via the network interface and to analyze the set of input applications to identify a plurality of custom APIs in the set of input applications. The processor is further configured to determine a set of privacy relevant features from the plurality of identified custom APIs and to store the set of privacy relevant features in the memory. The processor is further configured to detect execution of a candidate API subsequent to storing the set of privacy relevant features in the memory. The processor is further configured to extract one or more features from the candidate API and to compare the extracted one or more features to the set of privacy relevant features in order to determine the privacy relevance of the candidate API.

Example 15 includes the computer system of Example 14, wherein the processor is configured to determine the set of privacy relevant features by generating a respective taint specification for each identified custom API, each taint specification relating one or more sources of data to one or more data sinks; generating one or more taint flows based on each taint specification, the one or more taint flows being a data path and associated data values between a source of data and a data sink; matching one or more features and associated feature values from the one or more taint flows to a set of feature templates; and correlating the one or more matched features and associated feature values with respective privacy relevance of the plurality of custom APIs to identify the set of privacy relevant features and associated feature values.

Example 16 includes the computer system of Example 15, wherein the set of feature templates includes at least one of a plurality of keywords, a plurality of channel properties, and a plurality of data transformations.

Example 17 includes the computer system of any of Examples 15-16, wherein the processor is further configured to correlate the one or more matched features and associated feature values with respective privacy relevance of the plurality of custom APIs by grouping the matched features based on similarity of features and associated feature values; and annotating each group as privacy relevant or privacy irrelevant.

Example 18 includes the computer system of any of Examples 15-16, wherein the processor is further configured to correlate the one or more matched features and associated feature values with respective privacy relevance of the plurality of custom APIs by annotating each instance of each custom API as privacy relevant or privacy irrelevant; and identifying features and associated feature values of privacy relevant instances of the plurality of custom APIs as the set of privacy relevant features.

Example 19 includes the computer system of any of Examples 14-18, wherein the computer system further comprises a user output device; wherein the processor is further configured to output an indication of the privacy relevance of the candidate API via the user output device.

Example 20 includes the computer system of any of Examples 14-19, wherein the processor is further configured to analyze the set of input applications by searching respective abstract syntax trees, each representative of one of the set of input applications, to identify the plurality of custom APIs.

Although specific embodiments have been illustrated and described herein, it will be appreciated by those of ordinary skill in the art that any arrangement, which is calculated to achieve the same purpose, may be substituted for the specific embodiments shown.

What is claimed is:

1. A computer-implemented method of classifying privacy relevance of an application programming interface (API), the computer implemented method comprising:
in response to receiving a set of input applications, analyzing, by a processor of a computer system, the set of input applications to identify a plurality of custom APIs, via one or more abstract syntax trees (ASTs), wherein representative code of the set of input applications is stored in the one or more ASTs;
generating, by the processor of the computer system, a respective taint specification for each identified custom API, each respective taint specification relating one or more sources of data to one or more data sinks;
generating, by the processor of the computer system, one or more taint flows based on the each respective taint specification, the one or more taint flows being a data path and associated data values between a source of data and a data sink, via data recorded from instrumenting the set of input applications based on the each respective taint specification;
matching, by the processor of the computer system, one or more features and associated feature values from the one or more taint flows to a set of feature templates, via a representative code of each application of the set of input applications,
wherein the representative code is searched to find one or more occurrences of each identified custom API;
correlating, by the processor of the computer system, the matched one or more features and associated feature values with respective privacy relevance of the plurality of custom APIs to identify a set of privacy relevant features;
clustering, by the processor of the computer system, the custom APIs from the set of input applications into separate groups based on similarity between the matched one or more features and associated feature values of each identified custom API,
wherein the clustering is unsupervised;
detecting, by the processor of the computer system, a candidate API;
extracting, by the processor of the computer system, one or more features from the candidate API;
comparing, by the processor of the computer system, the one or more features extracted from the candidate API to the set of privacy relevant features;
assigning, by the processor of the computer system, a label to the candidate API indicating privacy relevance of the candidate API; and
outputting an indication of the privacy relevancy of the candidate API via a user output device.

2. The method of claim 1, wherein analyzing the set of input applications to identify a plurality of custom APIs comprises searching respective abstract syntax trees, each representative of one of the set of input applications, to identify the plurality of custom APIs.

3. The method of claim 1, wherein the set of feature templates includes a plurality of keywords.

4. The method of claim 1, wherein the set of feature templates includes a plurality of channel properties.

5. The method of claim 1, wherein the set of feature templates includes a plurality of proximate transformations.

6. The method of claim 1, wherein correlating the matched one or more features and associated feature values with respective privacy relevance of the plurality of custom APIs comprises:
grouping the matched one or more features based on similarity of features and associated feature values; and
annotating each group as privacy relevant or privacy irrelevant.

7. The method of claim 1, wherein correlating the matched one or more features and associated feature values with respective privacy relevance of the plurality of custom APIs comprises:

annotating each instance of each identified custom API as privacy relevant or privacy irrelevant; and
identifying features and associated feature values of privacy relevant instances of the plurality of custom APIs as the set of privacy relevant features.

8. A program product comprising a non-transitory processor-readable storage medium having program instructions embodied thereon, wherein the program instructions are configured, when executed by at least one programmable processor, to cause the at least one programmable processor to:
in response to receiving a set of input applications analyze, by a processor of a computer system, the set of input applications to identify a plurality of custom application programming interfaces (APIs), via one or more abstract syntax trees (ASTs),
wherein representative code of the set of input applications is stored in the one or more ASTs;
generate, by the processor of the computer system, a respective taint specification for each identified custom API, each respective taint specification relating one or more sources of data to one or more data sinks;
generate, by the processor of the computer system, one or more taint flows based on the each respective taint specification, the one or more taint flows being a data path and associated data values between a source of data and a data sink, via data recorded from instrumenting the set of input applications based on the each respective taint specification;
match, by the processor of the computer system, one or more features and associated feature values from the one or more taint flows to a set of feature templates, via a representative code of each application of the set of input applications,
wherein the representative code is searched to find one or more occurrences of each identified custom API;
correlate, by the processor of the computer system, the matched one or more features and associated feature values with respective privacy relevance of the plurality of custom APIs to identify a set of privacy relevant features;
cluster, by the processor of the computer system, the plurality of custom APIs from the set of input applications into separate groups based on similarity between the matched one or more features and associated feature values of each identified custom API,
wherein the clustering is unsupervised;
detect, by the processor of the computer system, a candidate API;
extract, by the processor of the computer system, one or more features from the candidate API;
compare the one or more features extracted from the candidate API to the set of privacy relevant features;
assign a label to the candidate API indicating privacy relevance of the candidate API; and
output an indication of the privacy relevancy of the candidate API via a user output device.

9. The program product of claim 8, wherein the program instructions are further configured to cause the at least one programmable processor to analyze the set of input applications by searching respective abstract syntax trees, each representative of one of the set of input applications, to identify the plurality of custom APIs.

10. The program product of claim 8, wherein the set of feature templates includes a plurality of keywords.

11. The program product of claim 8, wherein the set of feature templates includes at least one of a plurality of channel properties and a plurality of data transformations.

12. The program product of claim 8, wherein the program instructions are further configured to cause the at least one programmable processor to correlate the matched one or more features and associated feature values with respective privacy relevance of the plurality of custom APIs by:
grouping the matched one or more features based on similarity of features and associated feature values; and
annotating each group as privacy relevant or privacy irrelevant.

13. The program product of claim 8, wherein the program instructions are further configured to cause the at least one programmable processor to correlate the matched one or more features and associated feature values with respective privacy relevance of the plurality of custom APIs by:
annotating each instance of each identified custom API as privacy relevant or privacy irrelevant; and
identifying features and associated feature values of privacy relevant instances of the plurality of custom APIs as the set of privacy relevant features.

14. A computer system comprising:
a memory;
a network interface; and
a processor communicatively coupled to the memory and the network interface,
wherein the processor is configured to obtain a set of input applications via the network interface and to analyze the set of input applications to identify a plurality of custom application programming interface (APIs) in the set of input applications, via one or more abstract syntax trees (ASTs),
wherein representative code of the set of input applications is stored in the one or more ASTs,
wherein the processor is further configured to determine a set of privacy relevant features from the plurality of identified custom APIs and to store the set of privacy relevant features in the memory,
wherein the representative code is searched to find one or more occurrences of each identified custom API,
wherein the processor is further configured to cluster the custom APIs from the set of input applications into separate groups based on similarity between respective identified feature values of each identified custom API,
wherein the clustering is unsupervised,
wherein the processor is further configured to detect execution of a candidate API subsequent to storing the set of privacy relevant features in the memory,
wherein the processor is further configured to extract one or more features from the candidate API,
wherein the processor is further configured to compare the extracted one or more features to the set of privacy relevant features in order to determine the privacy relevance of the candidate API,
wherein the processor is further configured to assign a label to the candidate API indicating privacy relevance of the candidate API,
wherein the processor is configured to provide an indication of the privacy relevancy of the candidate API via the user output device,
wherein the processor is configured to determine the set of privacy relevant features by:
generating, by the processor of the computer system, a respective taint specification for each identified custom API, each respective taint specification relating one or more sources of data to one or more data sinks;
generating, by the processor of the computer system, one or more taint flows based on each respective taint specification, the one or more taint flows being a data path and associated data values between a source of data and a data sink, via data recorded from instrumenting the set of input applications based on the each respective taint specification;
matching, by the processor of the computer system, one or more features and associated feature values from the one or more taint flows to a set of feature templates, via a representative code of each application of the set of input applications;
correlating, by the processor of the computer system, the matched one or more features and associated feature values with respective privacy relevance of the plurality of custom APIs to identify the set of privacy relevant features and associated feature values.

15. The computer system of claim 14, wherein the set of feature templates includes at least one of a plurality of keywords, a plurality of channel properties, and a plurality of data transformations.

16. The computer system of claim 14, wherein the processor is further configured to correlate the one or more matched one or more features and associated feature values with respective privacy relevance of the plurality of custom APIs by grouping the matched one or more features based on similarity of features and associated feature values and annotating each group as privacy relevant or privacy irrelevant.

17. The computer system of claim 14, wherein the processor is further configured to correlate the one or more matched one or more features and associated feature values with respective privacy relevance of the plurality of custom APIs by annotating each instance of each identified custom API as privacy relevant or privacy irrelevant and identifying features and associated feature values of privacy relevant instances of the plurality of custom APIs as the set of privacy relevant features.

18. The computer system of claim 14,
wherein the computer system further comprises a user output device, and
wherein the processor is further configured to output an indication of the privacy relevance of the candidate API via the user output device.

19. The computer system of claim 14, wherein the processor is further configured to analyze the set of input applications by searching respective abstract syntax trees, each representative of one of the set of input applications, to identify the plurality of custom APIs.

* * * * *